United States Patent [19]

Kodama et al.

[11] 4,388,901

[45] Jun. 21, 1983

[54] LUBRICATING OIL SUPPLY SYSTEM FOR A SUPERCHARGED ROTARY PISTON ENGINE

[75] Inventors: Hiroshi Kodama; Tooru Maeda; Toshio Miyatani, all of Hiroshima, Japan

[73] Assignee: Toyo Kogyo Co. Ltd., Hiroshima, Japan

[21] Appl. No.: 284,233

[22] Filed: Jul. 7, 1981

[30] Foreign Application Priority Data

Jul. 7, 1980 [JP] Japan .................................. 55-93141

[51] Int. Cl.³ ............................................. F01C 21/04
[52] U.S. Cl. ..................................... 123/213; 418/97; 418/100
[58] Field of Search ........................ 123/213, 216, 242; 418/97, 99, 100

[56] References Cited

U.S. PATENT DOCUMENTS

| | | | |
|---|---|---|---|
| 3,193,053 | 7/1965 | Scherenberg et al. | 418/100 X |
| 3,904,329 | 9/1975 | Steinwart | 418/99 |
| 3,990,818 | 11/1976 | Loyd | 418/97 X |
| 3,994,642 | 11/1976 | Johannes | 418/99 |

FOREIGN PATENT DOCUMENTS 56-34904 4/1981 Japan ...................................... 418/97

*Primary Examiner*—Michael Kooze
*Attorney, Agent, or Firm*—Fleit, Jacobson & Cohn

[57] ABSTRACT

A rotary piston engine having a supercharging blower located in the intake passage upstream of the throttle valve. A lubricating oil supply system includes oil passages opening through oil discharge nozzles to the intake passage downstream of the throttle valve and to the rotor housing. Air passages are provided and communicating at one ends with the oil passages and opening at the other end to the intake passage between the supercharging blower and the throttle valve.

7 Claims, 3 Drawing Figures

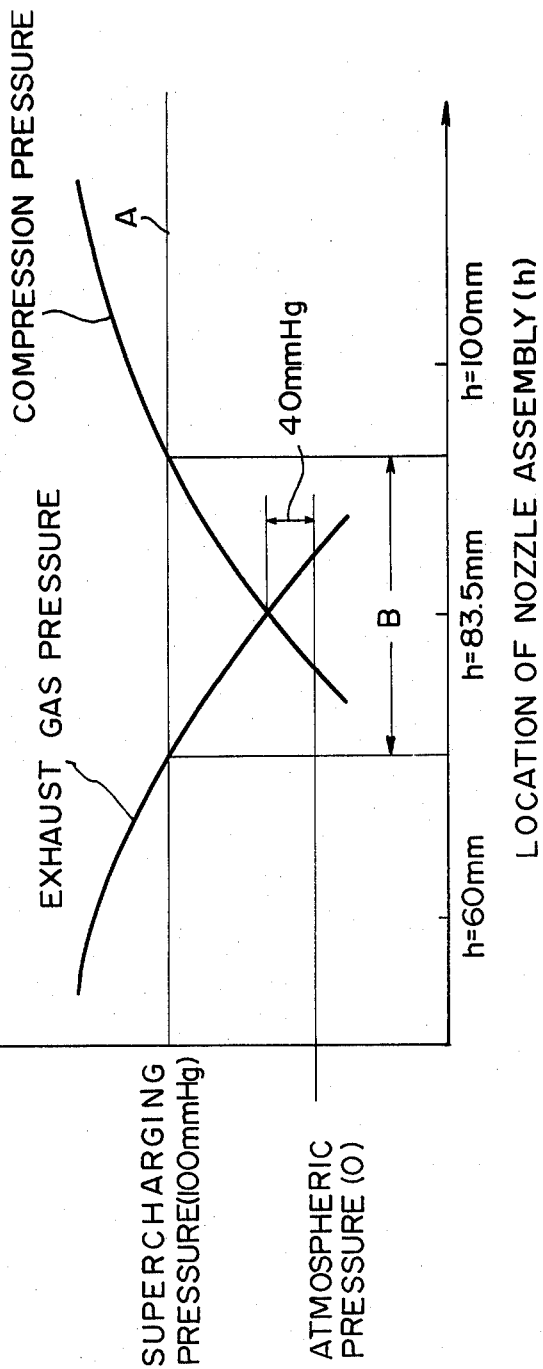

LUBRICATING OIL SUPPLY SYSTEM FOR A SUPERCHARGED ROTARY PISTON ENGINE

The present invention relates to a rotary piston engine and more particularly to a supercharged rotary piston engine. More specifically, the present invention pertains to a lubricating oil supply system for a supercharged rotary piston engine.

In general, a rotary piston engine includes a casing comprised of a rotor housing having a trochoidal inner wall and a pair of side housings attached to the opposite sides of the rotor housing to define a rotor cavity therein. A rotor of polygonal, usually triangular, configuration is disposed in the casing with apex portions in sliding engagement with the inner wall of the rotor housing. The rotor is provided at the apex portions with apex seals for engagement with the inner wall of the rotor housing and corner seals are further provided on the rotor at the opposite end portions of the apex seals. The rotor further carries side and oil seals which are provided on the side surfaces of the rotor for engagement with the inner walls of the side housings.

In this known type of rotary engine, a lubricating oil supply system is provided for supplying a metered amount of lubricating oil into the working chamber. The lubricating oil thus supplied serves to lubricate the apex, corner and side seals. The lubricating oil supply system generally includes an oil metering pump and an oil discharge nozzle which is connected with the oil metering pump. Where the oil discharge nozzle is located in the intake passage upstream of the throttle valve, the lubricant oil supplied therethrough is mixed with the intake mixture with the result that substantial part of the lubricating oil be burnt in the working chamber without being used as a lubricant to thereby increase oil consumption.

In view of the above problems, conventional lubricating oil supply systems include an oil discharge nozzle which is located so that the lubricating oil is supplied to the intake passage downstream of the throttle valve. Alternatively, the oil discharge nozzle may be provided on the rotor housing so that the lubricant oil be supplied directly to the working chamber. Further, two oil discharge nozzle may be provided, one in the intake passage downstream of the throttle valve and the other on the rotor housing. In these arrangements, however, a further problem has been encountered in that excessive amount of lubricant oil is drawn under the suction pressure prevailing in the intake passage and the working chamber, particularly during idling or light load operations of the engine.

In order to eliminate the above problem, proposal has been made to provide an air passage which opens at one end to the oil passage of the lubricating oil supply system and at the other end to atmosphere. For example, the U.S. Pat. No. 3,994,642 discloses a lubricating oil supply system for a rotary piston engine which includes an oil supply passage formed in the rotor housing and an air passage connected with the oil supply passage to provide a supply of bleed air to the oil passage. With this arrangement, it is possible to weaken the suction pressure applied to the oil passage under idling or light load operations of the engine to thereby decrease the amount of lubricant oil drawn into the working chamber.

The arrangement has been found satisfactory in normal engines, however, where the rotary piston engine is equipped with a supercharger for supplying supercharging air to the intake passage, the pressure in the intake passage and in the working chamber is generally higher than the atmospheric pressure. Therefore, in such a supercharged rotary piston engine, problems has been encountered in that a blow back of air is produced through the air passage from the intake passage or working chamber.

It is therefore an object of the present invention to provide a lubricating oil supply system for a supercharged rotary piston engine which has air bleed passage for preventing excessive amount of lubricating oil from being drawn under idling or light load operations of the engine but is free from the problem of blow back of the supercharged air through the air bleed passage.

Another object of the present invention is to provide a lubricating oil supply system for a rotary piston engine, which includes means for preventing excessive amount of lubricating oil from being drawn under a suction pressure in idling or light load engine operations as well as means for preventing blow back of supercharged air under medium or heavy load engine operations.

According to the present invention, the above and other objects can be accomplished by a rotary piston engine including a casing having a rotor cavity, a rotor disposed in said rotor cavity of the casing for rotation and defining working chambers in said casing, intake passage means for supplying a charge of intake gas to the working chambers, throttle valve means provided in said intake passage means for controlling flow of the intake gas passing therethrough, supercharging means provided in said intake passage means upstream of the throttle valve means, lubricant oil supply means including oil passage means opening through outlet port means to at least one of the intake passage means downstream of the throttle valve means and the rotary cavity, said lubricant oil supply means further including air passage means having one end opening to said oil passage means and the other end opening in the intake passage means between said supercharging means and the throttle valve means.

According to the present invention, in idling or light load operations of the engine in which the supercharging means is not effective, the air passage means functions to draw air into the oil passage means to thereby prevent excessive amount of lubricating oil from being drawn into the working chamber. Under medium or heavy load operations, the supercharging means is effective and the pressure applied to the outlet port means of the oil passage means is increased. However, since the air passage means is opened to the intake passage means downstream of the supercharging means, there will be no risk of blow back of the supercharged air through the air passage means.

According to the features of the present invention, the outlet port means of the oil passage means may be located in either of the intake passage means or the casing. Of course, it is also possible to locate the outlet port means in both the intake passage means and the casing. In such an arrangement, the oil supplied through the outlet port means in the casing functions mainly to lubricate the apex seals on the rotor whereas the oil through the other outlet port means functions mainly to lubricate the other parts of the engine. The supercharging means may be of a type in which the supercharging compressor is driven by an exhaust gas turbine, or any other type such as a motor-driven air pump.

The above and other objects and features of the present invention will become apparent from the following descriptions of a preferred embodiment taking reference to the accompanying drawings, in which:

FIG. 3 is a diagram showing the pressure in the working chamber and the supercharged pressure in the intake passage.

Figure 1:
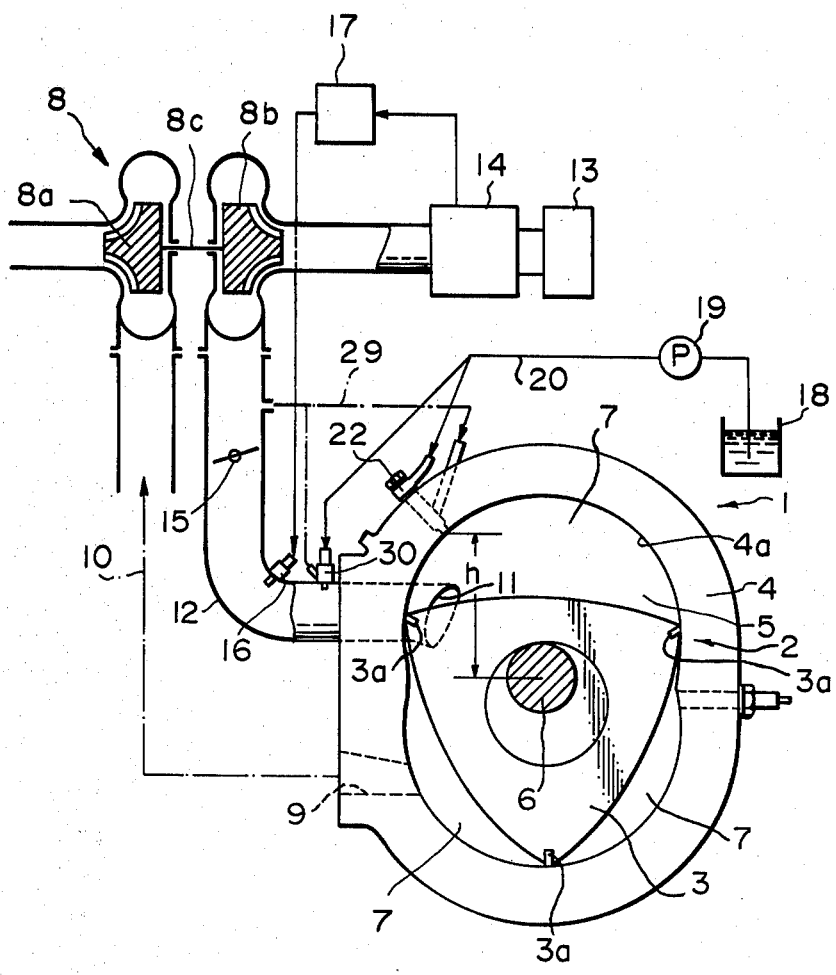
FIG. 1 is a schematic illustration of a rotary piston engine having a lubricating oil supply system in accordance with one embodiment of the present invention.

Referring now to the drawings, particularly to FIG. 1, there is shown a rotary piston engine including a casing 2 and a rotor 3. The casing 2 comprises a rotor housing 4 having a trochoidal inner wall 4a and a pair of said housings 5 attached to the opposite sides of the rotor housing 4 to define a rotor cavity therein. The rotor 3 is of a substantially triangular configuration having apex portions provided with apex seals 3a. The rotor 3 is carried by an eccentric shaft 6 and disposed in the rotor cavity of the casing 1 for rotation with the apex seals 3a in sliding contact with the inner wall 4a of the rotor housing 4. The rotor 3 thus defines three working chambers 7 of variable volume between the flanks thereof and the inner wall 4a of the rotor housing 4.

The rotor housing 4 is formed with an exhaust port 9 which leads to an exhause passage 10. One of the side housings 5 is formed with an intake port 11 which leads to an intake passage 12. At the upstream end of the intake passage 12, there is provided an air filter 13. In the intake passage 12, there are further provided with an air flow meter 14 and a throttle valve 15. The air flowmeter 14 produces an air flow signal which is applied to a microprocessor 17 for controlling the amount of fuel discharged through a fuel discharge nozzle 16 located in the intake passage 12 downstream of the throttle valve 15.

The engine 1 further includes a turbo-supercharger 8 comprising an exhaust gas turbine 8a located in the exhaust passage 10 and an air blower 8b located in the intake passage 12. The turbine 8a and the blower 8b are connected together by a shaft 8c. The turbine 8a is driven by the exhaust gas in the passage 10 and in turn drives the blower 8b to thereby supply supercharging air to the intake passage 12. The blower 8b of the supercharger 8 is located upstream of the throttle valve 15.

Figure 2:
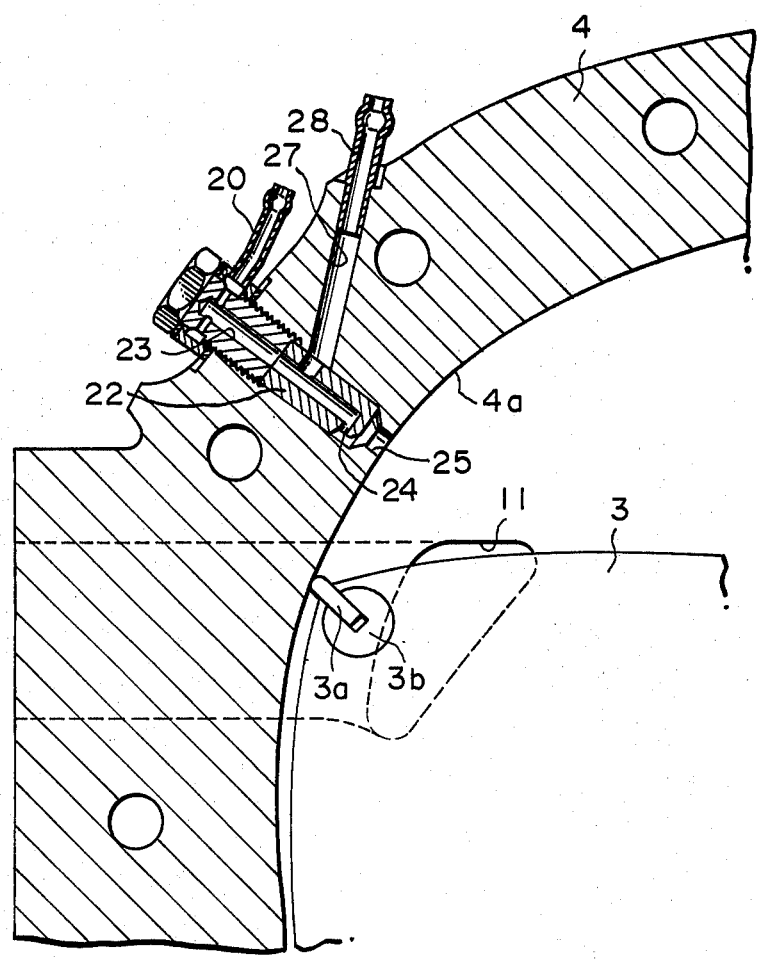
FIG. 2 is a fragmentary sectional view of the rotary piston engine particularly showing a lubricating oil discharge nozzle provided on the rotor housing.

The engine 1 is provided with a lubricating oil supply system including an oil reservoir 18 and an oil pump 19 for supplying lubricating oil from the reservoir 18 to an oil passage 20. As shown in FIG. 2, the oil passage 20 is connected with an oil discharge nozzle assembly 22 which is threadably mounted on the rotor housing 4. The nozzle assembly 22 has an axial passage 23 which is communicating at the axial outer end with the oil passage 20. The other end of the axial passage 23 is opened through a port 24 and leads to an oil outlet port 25 formed in the inner wall 4a of the rotor housing 4. An air passage 27 is formed in the rotor housing 4 so as to lead to the axial passage 23 in the nozzle assembly 22. The air passage 27 is connected through a connecting pipe 28 with an air conduit 29 which opens to the intake passage 12 between the blower 8b and the throttle valve 15.

A similar oil discharge nozzle assembly 30 is provided in the intake passage 12 downstream of the throttle valve 15. The nozzle assembly 30 is connected with the oil passage 20 and the air conduit 29 in a similar manner as in the nozzle assembly 22.

In idling or light load operations of the engine, the blower 8b of the supercharger 8 is not driven with a sufficient speed to provide a supply of supercharging air. Therefore, a strong suction pressure prevails in the working chamber 7 and the intake passage 12. Similar condition is also provided in deceleration. Since the intake passage 12 upstream of the throttle valve 15 is substantially at the atmospheric pressure, air is drawn through the air passage 29 to the oil discharge nozzle assemblies 22 and 30. Thus, the suction pressure applied to the axial passages in the nozzle assemblies 22 and 30 is weakened to thereby prevent excessive amount of oil from being drawn under the suction pressure.

In medium or heavy load operations, the blower 8b is driven sufficiently by the exhaust turbine to provide a supply of supercharging air so that the pressure in the intake passage 12 and the working chamber 7 is increased beyond the atmospheric pressure. However, since the air passage 29 is opened at the inlet end to the intake passage 12 downstream of the blower 8b, the pressure applied to the inlet end of the air passage 29 is not lower than that applied to the oil discharge nozzle assembly 30 which is located in the intake passage 12. Therefore, there is no possibility that blow back of air is produced through the nozzle assembly 30 to the air passage 29 and the lubricant oil is supplied under the pressure applied by the oil pump 19.

FIG. 3 shows the change in maximum pressure in the working chamber 7 along the inner wall 4a of the rotor housing 4. It will be noted in FIG. 3, the maximum pressure on the inner wall 4a of the rotor housing changes in accordance with the distance h along the major axis of the trochoid from the axis of the eccentric shaft 6. The pressure at the inlet end of the air conduit 29 is shown by the line A in FIG. 3. By locating the nozzle assembly 22 in the range B shown in FIG. 3, it is possible to prevent the blow back of the intake gas through the air conduit 29.

The invention has thus been shown and described with reference to a specific embodiment, however, it should be noted that the invention is in no way limited to the details of the illustrated structures but changes and modifications may be made without departing from the scope of the appended claims.

We claim:

1. A rotary piston engine including a casing having a rotor cavity, a rotor disposed in said rotor cavity of the casing for rotation and defining working chambers in said casing, intake passage means for supplying a charge of intake gas to the working chambers, throttle valve means provided in said intake passage means for controlling flow of the intake gas passing therethrough, supercharging means provided in said intake passage means upstream of the throttle valve means, lubricant oil supply means including oil passage means opening through outlet port means to at least one of the intake passage means downstream of the throttle valve means and the rotary cavity, said lubricant oil supply means further including air passage means having one end opening to said oil passage means and the other end opening to the intake passage means between said supercharging means and the throttle valve means.

2. A rotary piston engine in accordance with claim 1 in which said supercharging means is a turbo-supercharger.

3. A rotary piston engine in accordance with claim 1 in which said outlet port means of the lubricant oil supply means includes oil discharge nozzles located in both the casing and the intake passage means.

4. A rotary piston engine including a casing which is comprised of a rotor housing including an inner wall of a trochoidal configuration having a major and minor axis and a pair of side housings secured to the opposite sides of the rotor housing to define a rotor cavity, a substantially polygonal rotor disposed in said rotor cavity of the casing and carried by an eccentric shaft having a rotating axis aligned with center of the trochoidal configuration, said rotor being arranged for rotation with apex portions in sliding contact with the inner wall of the rotor housing to define working chambers of variable volumes, intake passage means having throttle valve means and opening to said rotor cavity, supercharging means having blower means disposed in said intake passage means upstream of the throttle valve means, lubricating oil supply means having oil passage means opening to said rotor cavity through outlet port means, air passage means having one end communicating with said oil passage means and the other end opening to said intake passage means between said blower means and said throttle valve means.

5. A rotary piston engine in accordance with claim 4 in which said outlet port means of the oil passage means is located in the rotor housing at a position where pressure at the outlet port means does not exceed pressure in the intake passage means between the blower means and the throttle valve means.

6. A rotary piston engine in accordance with claim 4 in which said oil passage means is further opened to said intake passage means downstream of the throttle valve means through second outlet port means.

7. A rotary piston engine including a casing which is comprised of a rotor housing including an inner wall of a trochoidal configuration having a major and minor axis and a pair of side housings secured to the opposite sides of the rotor housing to define a rotor cavity, a substantially polygonal rotor disposed in said rotor cavity of the casing and carried by an eccentric shaft having a rotating axis aligned with center of the trochoidal configuration, said rotor being arranged for rotation with apex portions in sliding contact with the inner wall of the rotor housing to define working chambers of variable volumes, intake passage means having throttle valve means and opening to said rotor cavity, supercharging means having blower means disposed in said intake passage means upstream of the throttle valve means, lubricating oil supply means having oil passage means opening to said intake passage means downstream of the throttle valve means through outlet port means, air passage means having one end communicating with said oil passage means and the other end opening to said intake passage means between said blower means and said throttle valve means.

* * * * *